Oct. 18, 1932.  H. W. ZELLNER  1,883,272
INCUBATOR AND BROODER
Filed April 6, 1929  6 Sheets-Sheet 5

Patented Oct. 18, 1932

1,883,272

UNITED STATES PATENT OFFICE

HARRY W. ZELLNER, OF SALT LAKE CITY, UTAH

INCUBATOR AND BROODER

Application filed April 6, 1929. Serial No. 353,014.

This invention has for its object to provide in one structure an incubator and a brooder of inexpensive construction but which will be highly efficient in operation. The invention provides a heating mechanism whereby the proper degree of heat may be easily maintained in both the incubating and the brooder chambers and also provides a construction which will effect automatic circulation of air within the chambers and ventilation of the chambers. The invention also provides means whereby the desired humidity of the air in the incubating chamber will be maintained and water may be supplied to the brooder chamber to satisfy the drinking needs of the young chicks. The invention also provides novel means for venting the heating elements whenever the lid or cover of either compartment may be raised, and further provides means whereby access to the brooder chamber from the incubator chamber may be readily had by the chicks and their passage from the incubating chamber to the brooder chamber will be expedited. The invention is illustrated in the accompanying drawings and will be hereinafter fully set forth.

Figure 1:
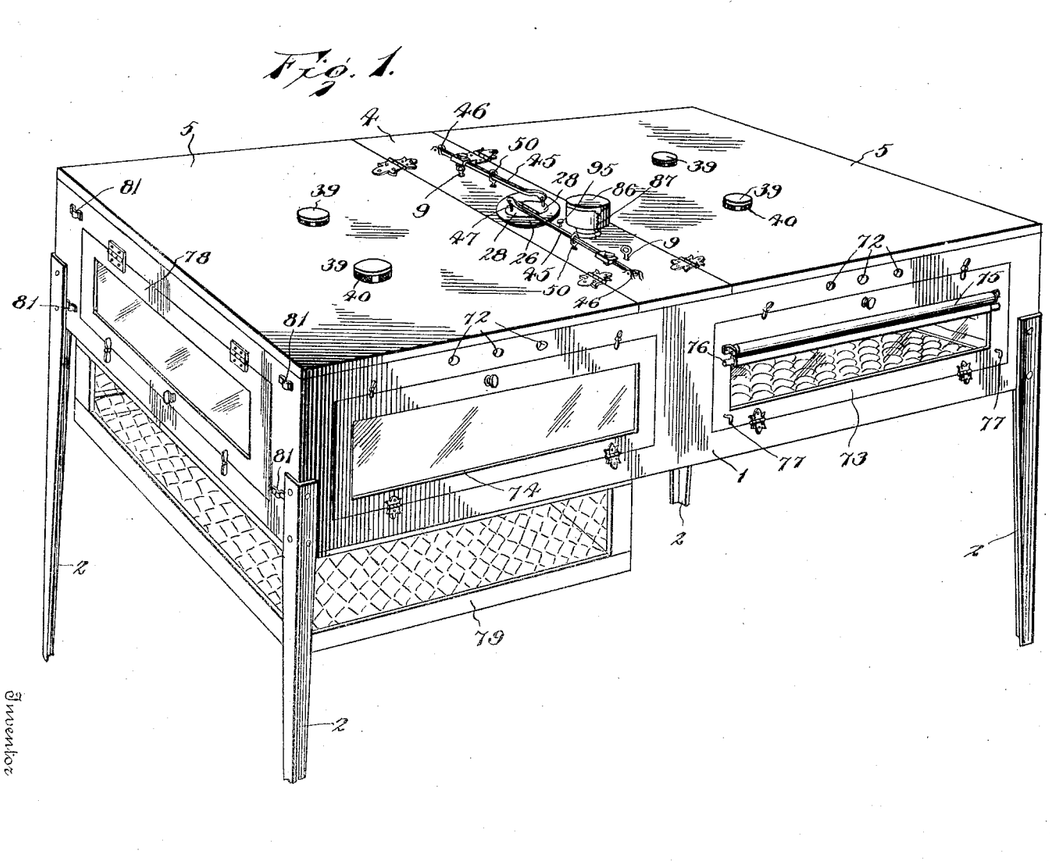
Figure 1 is a perspective view of an apparatus embodying the present invention.
Figure 2:
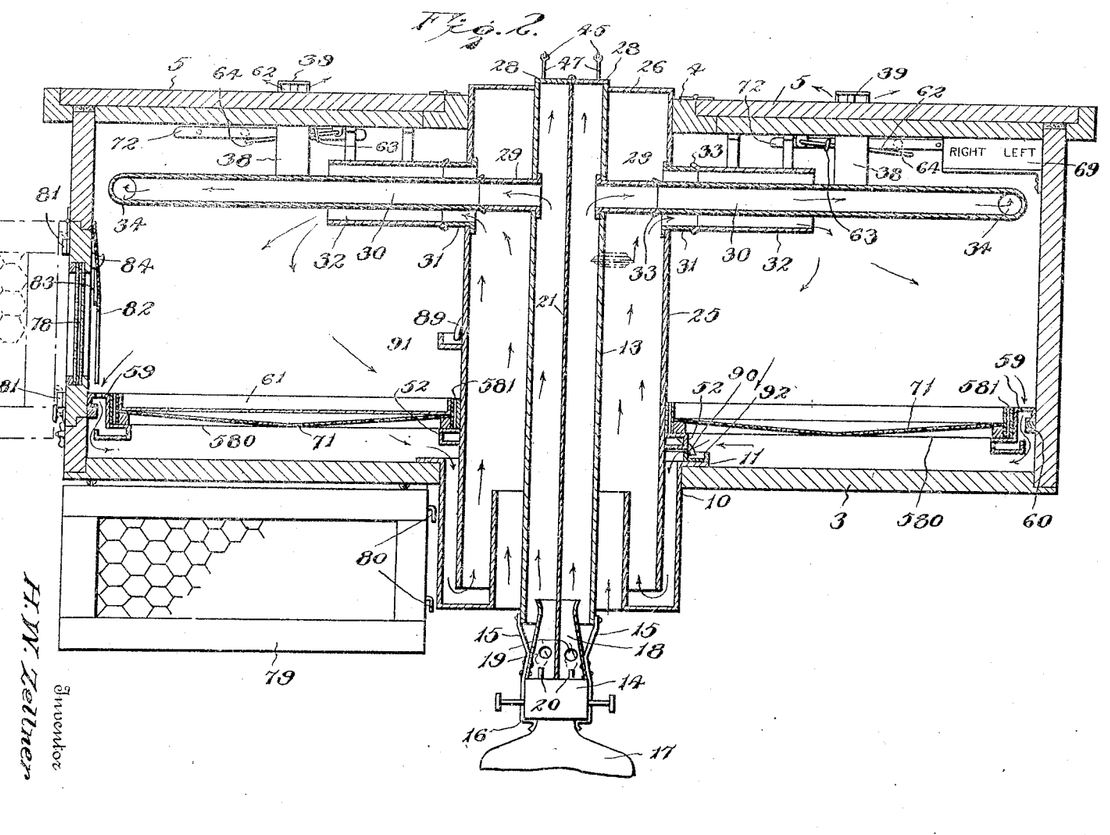
Fig. 2 is a vertical longitudinal section of the same.
Figure 3:
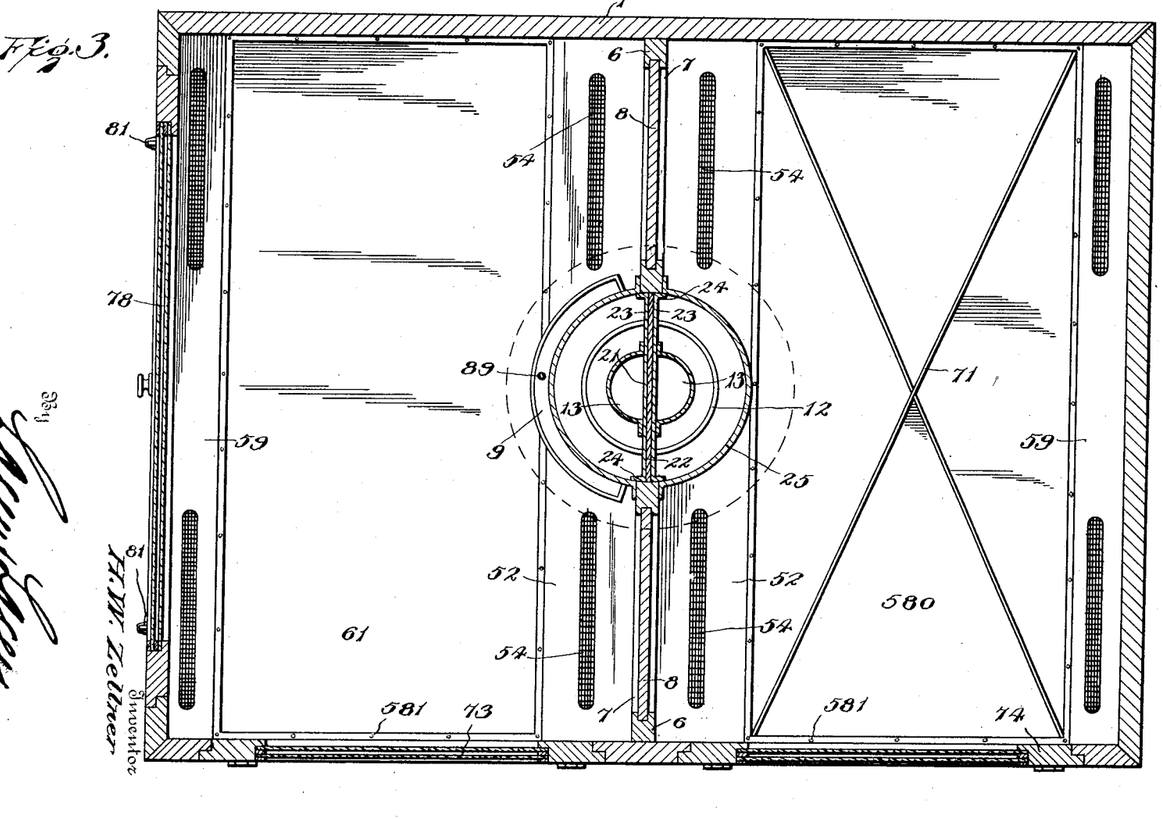
Fig. 3 is a horizontal section taken in a plane just above the drinking trough in the brooder chamber.
Figure 6:
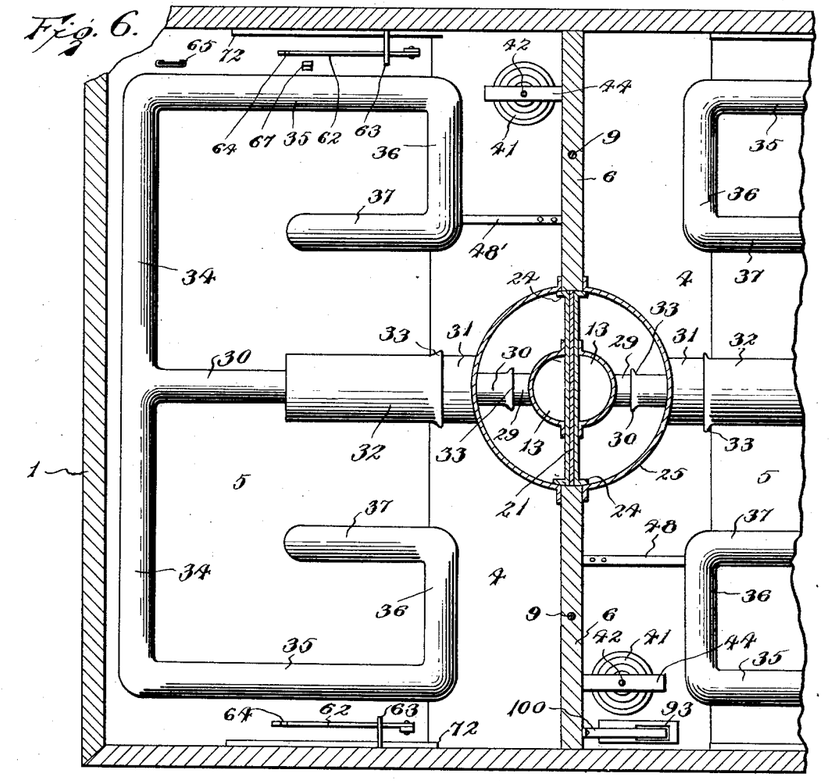
Fig. 6 is a bottom plan view of a portion of the top or cover structure.
Figure 10:
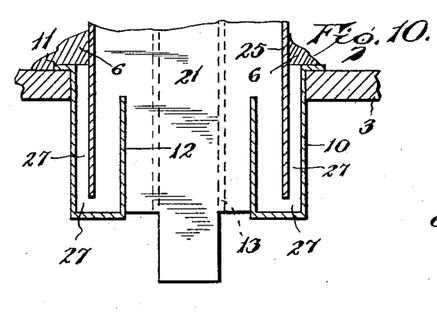
Fig. 10 is an enlarged detail section of the lower portion of the main heating flue.

In carrying out the present invention, there is provided a preferably rectangular housing or case 1 which is supported upon legs 2, as will be understood upon reference to Fig. 1. The casing 1 includes a floor 3 and side and end walls rising therefrom, the side walls having their upper edges connected centrally by a stationary or permanent cover member 4 to which are hinged lids 5 extending over the respective chambers and adapted to swing upwardly, as will be understood. A transverse partition 6 is provided between the side walls at the center of the same and extends from the fixed top 4 to the floor, as will be understood upon reference to Fig. 4, and in the said partition are openings 7 which afford passage between the incubating chamber and the brooder chamber. Within the partition and adapted to extend across each opening 7 is a door 8 which is slidably mounted in the side walls of the respective openings, as shown in Fig. 3, and from which rises a lifting rod 9 extending through an opening provided therefor in the stationary lid 4 and provided above said lid with a suitable handle. Normally the doors are in lowered closing position but when the eggs begin to hatch, the doors are raised so that the chicks may pass at once into the brooder chamber which, in actual practice, will have been raised to the proper temperature so that the chicks will not be exposed to a dangerous degree of cold. In the floor 3 at the center thereof is a preferably circular opening through which is fitted a well 10 depending below the floor and provided at its upper end with an annular flange 11 adapted to rest upon the floor and be secured thereto so that the well will be firmly supported by the floor. The well is also provided with an inner ring or tube 12 rising from its bottom and open at both ends, and arranged concentric with the well is a central heat flue 13, the upper end of which projects above the top of the casing 1 and the lower end of which extends through the lower open end of the ring 12, a lamp or other convenient form of heater 14 being suspended from the lower end of the flue 13, as shown clearly in Fig. 2. Upon reference to said Fig. 2, it will be noted that to the lower end of the central flue 13 are secured clips 15 which depend therefrom and have their lower ends turned inwardly and shouldered, as indicated at 16, whereby they are adapted to spring under the base of the lamp 14 to engage the same and firmly support the lamp. The lamp is equipped with a bowl or reservoir 17 of appreciable capacity so that ordinarily a supply of fuel may be provided sufficient to last through the entire hatching period. The lamp is also preferably provided with a chimney 18 of metal having windows 19 therein whereby the flame may be viewed and nicely regulated. The clips 15, as will be noted, are attached to the chimney so that the chimney need not be removed with the lamp. The lamp is provided with two burners 20 and these burners may be independently adjusted so that the heat supplied to the respective chambers in the casing 1 may be increased or diminished at will. A central partition 21 is disposed diametrically through the flue 13 and divides the same into two equal members, one of said members or compartments furnishing heat for the incubator chamber and the other compartment furnishing heat for the brooder chamber. The partition 21 may be of any approved construction and is preferably composed of a central sheet of asbestos, indicated at 22, and metal plates 23 disposed at opposite sides of the asbestos sheet, the edges of the metal plates being turned outwardly to provide flanges 24 which are rigidly secured to the wall of an outer cylindrical body or air flue 25. As will be noted upon reference to Figs. 3 and 6, the partition 21 is arranged in alinement with the partition 6, which may be with strict accuracy referred to as two separate partitions, and the cylindrical body or air flue 25 extends through the top of the casing 1 and is provided with a permanent closure 26. The lower end of the cylindrical body or air flue is open and is disposed between and concentric with the ring 12 and the wall of the well 10, terminating short of the bottom of the well, as clearly shown in Fig. 2. It is also to be noted that the partition 21 extends down into the chimney 18 of the heater and, as shown in Fig. 10, is slitted from its lower end to fit over the wall of the ring 12, there being also lateral lugs or wings 27 at the lower ends of the side edges of the partition to extend across the well and meet the lower end of the partition 6. The air flue as well as the heat flue is, consequently, divided into two sections or compartments and the desired circulation of the air and heat is thereby assured. The top of the heat flue 13 is equipped with a pair of dampers 28 which are automatically opened at times, and below the upper end of the flue outlet nipples 29 are provided thereon and directed toward the respective chambers of the casing 1. Fitted to these nozzles 29 and alined axially therewith are pipes 30 which extend into the incubator and brooder chambers, respectively, and, concentric with the nozzles 29 and pipes 30, nozzles 31 are provided on the air flue 25 and extend into the respective chambers, the ends of the nozzles 31 being adapted to fit within tubes 32 which are suspended by suitable brackets from the under sides of the respective hinged covers 5. The tubes 30 constitute circulating pipes which extend to points near the outer walls of the respective chambers and are disposed under and close to the respective lids, as will be understood upon reference to Fig. 2. The inner ends of the tubes 30 and 32 are flared somewhat, as shown at 33, so that they will fit closely around the outer ends of the respective nozzles while the outer ends of the tubes 30 merge into branches 34 extending toward the sides of the casing and then bent to lie parallel with the sides and extend inward toward the partitions 6, as shown at 35. The side portions or branches 35 merge into portions 36 projecting toward the respective tubes 30 and then again turning outwardly, as shown at 37, and extending to points near the central line of the respective cover 5, the respective branches 37 terminating in vertically disposed outlet nozzles 38 which extend through the cover and are firmly secured therein, guards 39 being formed over the respective terminals, as shown in Fig. 2. The ends of the terminal nozzles are preferably screened, as indicated at 40 in Fig. 1, so that the entrance of insects and particles of dirt into the flues will be avoided. It will be noted that, when a lid 5 is raised, the circulating pipe and the tube 32 connected therewith will be also raised and disengaged from the nozzles 29 and 31 and when the cover is again closed will automatically fit over the ends of the respective nozzles, the circulation of the heat being automatically reestablished.

The dampers 28 are normally closed but they are controlled by thermostats 41 mounted on the partitions 6 and located within the respective chambers. The thermostats each include a stem 42 rising through a sleeve 43 disposed between the fixed lid 4 and the bracket 44 which supports the thermostat, the stem rising through the lid and being connected above the same with a lever 45 pivoted at one end within a fulcrum bracket 46 on the lid and having its other end disposed over the respective damper 28 and connected therewith by a link 47 whereby upward movement of the thermostat stem will be transmitted through the lever to the damper to open the same. The stem has a threaded connection with the lever, as indicated at 48, so that the action of the thermostat may be nicely adjusted and the thermostat caused to respond to the desired variations in the temperature whereby the temperature in the chamber will be maintained at the desired degree. Should the temperature rise above a predetermined degree, the thermostat will expand and raise the lever 45 so that the damper will be opened and when the temperature falls, the thermostat will contract and permit the damper to close. In order that the hot air currents may not inconvenience the operator when he is changing the eggs or inspecting the interior of the incubator or brooder chamber, I provide means for automatically opening the corresponding damper whenever either lid 5 is raised. This device comprises a resilient arm 48' which is secured to the under side of the fixed lid 4 and has its free end projecting under the swinging cover 5, as shown most clearly in Fig. 13. Between its ends, there is secured to the resilient arm a stem 49 which rises through the fixed lid 4 and has its upper extremity formed into or provided with a loop or eye 50 passing around the respective lever 45. Whenever the lid 5 is raised, the resiliency of the arm 48 causes it to spring upwardly, as indicated by the dotted lines in Fig. 13, and this movement is, of course, transmitted directly to the eye 50 which bears against the under side of the lever 45 and rocks the same upwardly so that the attached damper will be opened. Of course, when the lid is again closed, the resilient arm will be depressed and the loop or eye 50 drawn downwardly so that the lever will then be free to respond to the action of the thermostat.

Extending along the sides of the partitions 6 are bars 51 spaced vertically from the floor 3, and upon these bars are disposed ventilating tray-supporting cleats 52, the cleats being recessed or cut away at their centers to fit around the air flue 25. As shown most clearly in Figs. 5 and 8, each cleat 52 comprises an upper tread member 53 in which are ventilating openings 54, a reentrant flange 55 being provided along the inner edge of the tread member 53 to rest upon the bar 51 and thereby support the cleat, as will be understood upon reference to Fig. 5. From the outer edge of the tread member 53 a riser 56 depends to a shelf or second tread member 57 upon which the edge of a tray 580 may rest. From the outer edge of the shelf or tread member 57, the metal of the cleat is carried downwardly, inwardly and then upwardly to provide a second re-entrant flange 58 extending beyond the vertical plane of the riser 56 and also disposed in spaced relation to the floor 3 and bar 51, as shown best in Fig. 5. There is thus provided an open space around and through the cleats through which the air may circulate so as to aid in attaining the desired even temperature through all parts of the chamber in which the cleat is located, and vents 581 are provided through the walls of the tray. The outer edge of the tray 580 is supported upon a second ventilating cleat 59 which is mounted on a bar 60 extending along the outer end wall of the casing 1. The tray 580 in the incubating chamber is intended to receive the eggs for hatching but the tray in the brooder chamber receives a supplemental tray 61 which contains sand upon which the chicks may play after passing from the incubator chamber.

It will now be understood that heat from the lamp or heater 14 passes upwardly through the sections of the flue 13 and passes therefrom into the pipes 30, thence circulating through the pipes 30 to 37 and escaping through the outlets 38. The lower end of the flue 13 is open, as clearly shown in Fig. 2, and fresh air is constantly drawn into the flue so that all stagnation with consequent foul odors will be avoided. Normally the dampers 28 are closed, as has been stated, and the heat currents will flow through the pipes 30, as has been described. Should the temperature rise too high, the thermostats will operate to open the respective dampers and the hot air will then pass directly out through the upper end of the flue 13. This action will also occur whenever either lid 5 is open but, as the opening is at the top of the respective chamber, the reduction in temperature following the raising of the lid will not be so severe or sudden as to detrimentally chill the eggs, as is the case where the inspection is necessarily effected through doors provided in the sides or ends of the incubator chamber and which swing outwardly therefrom. The described circulation of the heat from the lamp 14 will raise the temperature of the air in the air flue 25 which surrounds the heat flue and this air will then flow through the nozzles 31 and tubes 32 out into the incubator or brooder chamber, as the case may be, and thence flow downwardly to play upon the eggs in the tray 580 or warm the chicks upon the sand tray 61. As indicated by the arrows, the descending air currents pass through the outer cleats 59 and also through the inner cleats 52, thence flowing down through the well 10 around the lower end of the air flue 25 to again enter and rise through said flue. The lower end of the ring 12 being open, fresh air will be constantly drawn in through said ring to keep the previously heated air pure, as will be understood.

Figures 12, 13, 14, 15:
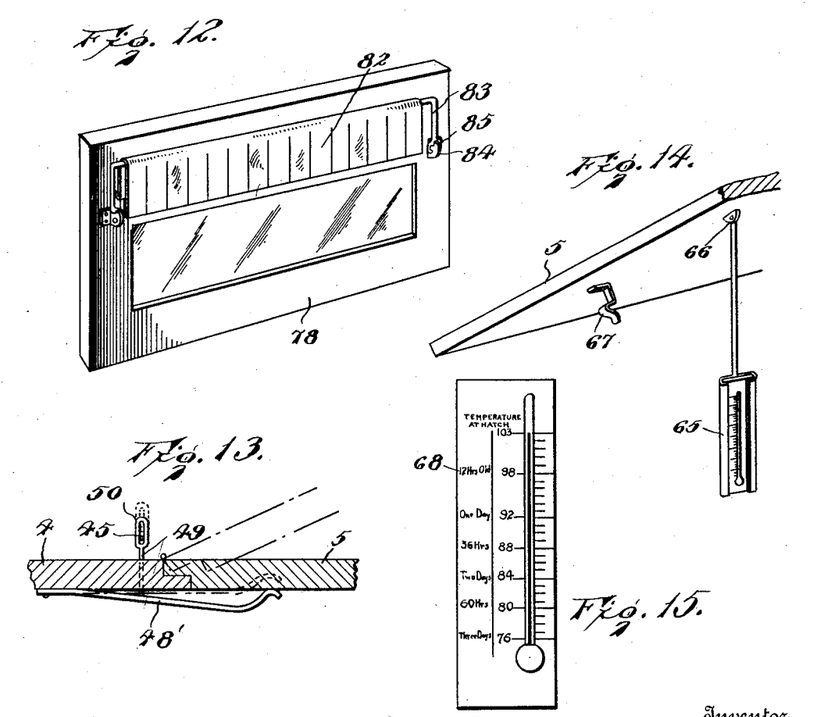
Fig. 12 is a detail perspective of a glazed door which is provided in the wall of the brooder chamber and a curtain which is mounted on said door.
Fig. 13 is a detail view showing the device for automatically venting the main heat flue.
Fig. 14 is a detail perspective view illustrating a manner of supporting a thermometer in the incubator chamber.
Fig. 15 is a detail view of the thermometer in the brooder chamber.

Each lid 5 has pivoted to its under side a prop 62 which works through a keeper 63 on the side of the casing 1 and is provided near its free end with a notch 64 adapted to engage the keeper and thereby support the lid in raised position in a well understood manner. There is also suspended upon each lid a thermometer, the thermometer for the incubator chamber being shown in Fig. 14 and being carried in a casing or holder 65 so that the glass thermometer tube will be protected against breakage. The holder 65 is pivotally attached to the under side of the lid, as shown at 66, so that, when the lid is swung upwardly, the thermometer holder will fold or swing close to the lid and may be engaged by a holding bracket or clip 67 secured on the lid and thereby held against all swinging movement and out of the way while the eggs are being turned or any other necessary operation being performed. Of course, when the lid is to be lowered, the thermometer holder will be released from the spring clip and will then resume its pendent position as the lid closes. The thermometer for the brooder chamber is shown in Fig. 15 and is of ordinary construction but is calibrated to indicate the temperatures desirable at various periods after incubation. When the chicks have just been hatched, the brooder chamber should be at a temperature of 103 degrees and to this end heat may be turned into the brooder chamber for a day or two previous to the expected hatching. When the chicks are twelve hours old, the temperature in the brooder chamber should be reduced to 98 degrees and in order that the operator may be positively and constantly reminded of this fact there is placed upon the face of the thermometer the legend "12 hrs. old", as shown at 68, in alinement with the notation 98. It will be also noted that the face of the thermometer bears the legend "1 day" alined with the temperature notation 92, "36 hrs." alined with the notation 88 on the temperature scale, "2 days" alined with the notation 84, "60 hrs." alined with the notation 80, and "3 days" alined with the notation 76.

Figures 4, 5, 9:
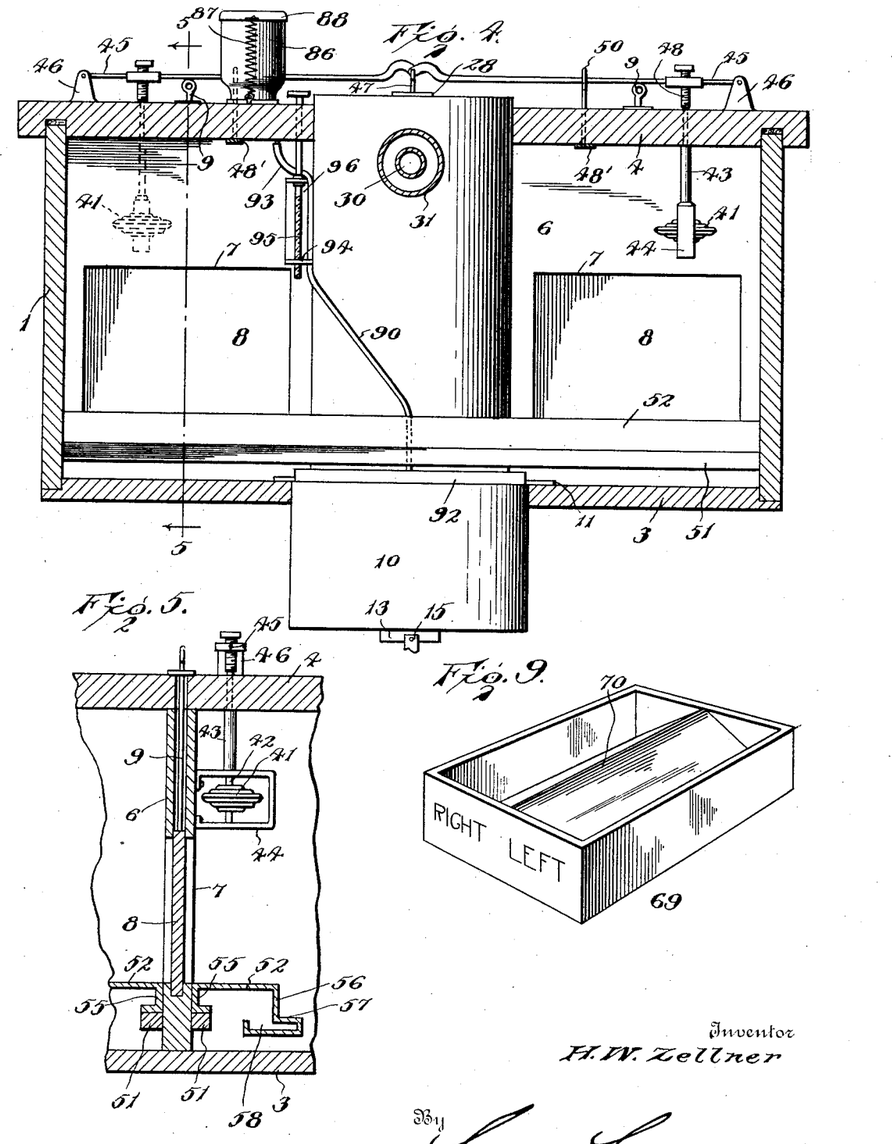
Fig. 4 is a transverse vertical section.
Fig. 5 is a detail section on the line 5—5 of Fig. 4.
Fig. 9 is a detail perspective view of the tray which may be used to assist in reversing the eggs.

It is well known that during the hatching period the eggs should be rolled, and various means have been suggested for mechanically rolling or inverting the eggs. In the present apparatus, these mechanical devices are not employed as better results are attained by manual manipulation of the eggs. To aid in the desired rolling of the eggs, I provide what I call the reversing or rolling tray, indicated at 69, and located in the upper portion of the incubator chamber. This reversing tray is a rectangular box supported in any convenient manner within the upper portion of the incubator chamber and having therein a longitudinal partition 70 which inclines from the top of the tray toward the opposite sides of the same at the bottom thereof. Two substantially triangular recesses are thus formed in the tray and upon the end of the tray are displayed the legends "Right" and "Left," the legend "Right" being placed at the left hand side of the ridge of the partition 70 and the legend "Left" being placed at the right hand side of said ridge. The bottom of the tray 580 is inclined from both ends and both sides toward the center, as indicated at 71, and the eggs tend constantly, therefore, to gravitate toward the center of the tray. When a period arrives at which the eggs should be reversed, the attendant lifts from the tray 580 the eggs at the right hand side of the center thereof and places them in that recess of the reversing tray which is marked "Right." The eggs first taken up are taken from the center and, of course, the eggs which were at a higher point on the bottom of the tray will roll toward the center. When the reversing tray 69 has been filled, space will be provided within the tray 580 by the shifting of the eggs remaining therein to replace the eggs which have been temporarily deposited in the tray 69. The eggs in that compartment labeled "Right" are placed at the left side of the tray 580 and will necessarily be placed closer to the outer side of the tray than to the center thereof inasmuch as the eggs remaining in the tray have gravitated toward the center. By this simple expedient, I attain that reversing and rolling of the eggs which is highly desirable.

The circulation of the heat currents and the air within the compartments of the casing 1 works against stagnation, as has been stated, but to further provide for ventilation, I provide ventilators 72 in the sides of the casing so that the fouled air which naturally collects at the top of the casing may readily escape.

In the front of the casing 1 are glazed doors 73 and 74 which are adapted to swing downwardly, the door 73 being provided in the front of the incubator chamber and the door 74 being provided in the front of the brooder chamber. These doors ordinarily are not to be opened but are provided in order that the attendant may inspect the progress of the hatch and the condition of the chicks at any time. A curtain 75 is provided and is ordinarily rolled so as to expose the glazed opening of the door. When the chicks begin to break through the eggs, this curtain is lowered and the stick 76 in its lower edge is engaged under hook 77 on the door below the glazed opening thereof so that the incubator chamber will be darkened. At the same time, however, the doors 8 are raised so that the newly hatched chicks will be attracted by the light in the brooder chamber and will at once pass into the latter.

A glazed door 78 is also provided in the end of the brooder chamber and this door is adapted to be opened outwardly and downwardly to permit the chicks to pass into an open air play receptacle or basket, indicated at 79, so that when the chicks have developed sufficiently, they may be acclimated to the outside air. This basket or acclimator is ordinarily suspended under the casing 1, as shown in Figs. 1 and 2, but when the chicks have attained the proper growth the acclimator has the hooks 80 on one side thereof engaged in keepers 81 on the outer side of the end wall of the casing 1 so that the acclimator will be supported around the opening in which the door 78 is mounted. The chicks may then pass readily from the tray 61 into the acclimator, as will be obvious. Upon the inner side of the door 78 is mounted a slitted brooder curtain 82 which has its upper edge secured to the door and its intermediate portion passing over a bail or U-shaped support 83 which is pivoted at its ends in brackets 84 upon the door. Normally the curtain is raised, as shown in Fig. 12, the bail or U-shaped frame 83 being disposed upright and thereby producing a fold in the curtain, and it will be noted that the end portions of the bail are somewhat resilient so that they may engage behind locking shoulders 85 formed on the brackets 84 to be maintained in their upright position. When the door is opened and the chicks pass into the acclimator, the holder 83 may be swung downwardly so that the curtain will extend across the door opening and the younger chicks will then be protected against the chilling influence of the outside air while the older chicks may pass into the acclimator as they desire.

On the fixed lid 4 at any convenient point is provided a reservoir 86 which may conveniently be a large bottle-shaped vessel of well known form and held to an opening provided therefor in the lid by springs 87 provided at the sides of the reservoir and connected to the lid and to a cap 88 fitted over the upper end of the vessel. From the lower end or mouth of the reservoir pipes, indicated at 89 and 90, pass through the fixed lid into the interior of the casing and down along the air flue 25 to discharge into a drinking trough 91 in the brooder chamber and a moisture trough 92 in the incubator chamber. The pipe 90 has one section consisting of a flexible hose, as indicated at 93, and attached to said pipe 90 is a plate or nut 94 engaged with an adjusting screw 95 swiveled in a bracket 96 which is secured upon the side of the air flue 25. The adjusting screw projects through the fixed lid 4, and it will be understood that by properly rotating the screw the pipe 90 may be raised or lowered from the trough 92. To cut off the flow, the pipe is lowered so that its lower end will bear firmly upon the bottom of the trough. To cut off the flow through the pipe 89, however, it is convenient to provide an ordinary plug stopper to be fitted into the connection of said pipe with the reservoir. The moisture trough 92 is supported on the flange 11 of the well 10 and is located below the tray 580 while the trough 91 is mounted upon the air flue 25 at such a height that it may be easily reached by the chicks. It is intended that the water in the trough 92 be evaporated by the heat in the incubating chamber so that the moisture or vapor will rise through the chamber and impart to the air therein the humidity which is desirable for a successful hatch.

Figures 7, 8:
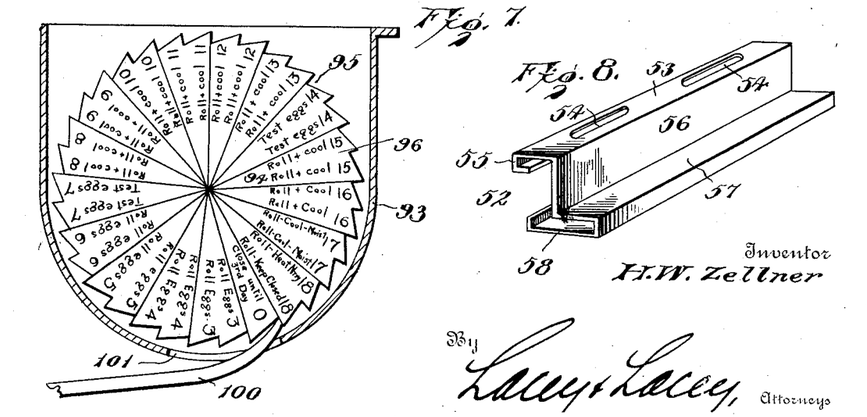
Fig. 7 is an enlarged sectional elevation of an instruction device.
Fig. 8 is a detail perspective view of one of the ventilating tray-supporting cleats.
Figure 11:
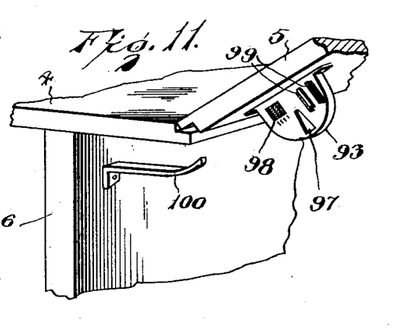
Fig. 11 is a detail perspective view of a portion of the lid having the instruction device secured thereto.

There is also provided upon the lid 5 in the incubator chamber an instruction indicator including a semi-cylindrical casing 193 which is secured to the under side of the lid 5, as shown most clearly in Fig. 11, and within this casing is a rotatable member 194, the periphery of which is of stepped or toothed formation, as shown at 195 in Fig. 7. Upon the sides of this rotatable member, or if preferred, across the faces of the several teeth in the periphery thereof are displayed in any convenient manner legends, as indicated at 196, which constitute instructions to the operator as to acts to be done in watching the hatch. These legends or inscriptions are viewed through a sight opening, such as indicated at 97, which may be located in the side of the casing or in the edge of the same according to the disposition of the legends upon the rotatable member. Some of these legends may be displayed in colors contrasting with other legends and a color chart, indicated at 98, may be provided upon the side of the casing. The casing is also provided with shouldered ledges 99 adapted to receive a card displaying the date when the hatch was set and the date when the breaking of the shells is due. Referring to Fig. 7, it will be noted that the legend-containing spaces of the rotatable member 194 bear numbers, these numbers corresponding to the days of the hatching period and the indicating legends are corelated to the numbers. In the space marked "Zero" it will be noted the legend is "Close until 3rd day" and, as the date when the eggs are set will be noted upon the card in the holder 99, it will, of course, be a very simple matter to know when the third day arrives and on said day the lid 5 of the incubating chamber is raised. When the lid is raised, the member 194 moves away from an actuating arm 100 which is secured upon the partition 6 and is adapted to project through an opening 101 in the casing 193 to engage the toothed edge of the rotatable member. When the lid is again closed, the end of this actuator will engage a tooth next adjacent the previously engaged toothed so that as the lid reaches its fully closed position the member 194 will be rotated one step. Therefore, when the lid is opened on the third day, the operator will read the legend or instruction "Roll eggs" and this instruction or legend is duplicated inasmuch as good practice requires that the hatch be inspected twice daily.

From the foregoing description, taken in connection with the accompanying drawings, it will be seen that I have provided a very compact structure in which there are provided an incubating chamber and a brooder chamber so that, when the chicks begin to break through the eggs, they may pass at once into the brooder chamber and will not be required to remain in the incubating chamber where they are apt to walk over the eggs and prematurely break the same and, consequently, cause a loss of chicks. The trays are supported on a level with the cleats 52 over which the chicks travel to the brooder chamber and, consequently, there is no liability of the chicks falling and being killed as a result of injuries suffered thereby. It is especially to be noted that, inasmuch as the inspection of the eggs is through the top of the incubating chamber, the colder outside air does not pass directly onto the eggs as is the case when inspection is made through the side and, consequently, the eggs cannot chill while rolling nor can the young chicks become chilled inasmuch as the instruction chart will inform the attendant on the seventeenth day that the brooder chamber or nursery should be heated. The tray-supporting cleats are removable and cleaning of the apparatus is very easy. The trough for supplying humidity to the air in the incubating chamber being disposed below the tray, the chicks cannot wade in said trough. The temperature in the brooder chamber is such that the water in the drinking trough will be warm enough for the chicks to drink freely without suffering any chilling therefrom and chicks may be developed in the brooder and acclimator while other chicks are hatching out in the incubating chamber. The casing is preferably single-walled thereby eliminating the dead-air space found in double-wall structures and which is considered essential in all other incubators, so far as I am aware, and to which is now generally attributed many ills that destroy large numbers of young chicks. The single-wall construction is, of course, less expensive than the double-wall structure.

Having thus described the invention, I claim:

1. An incubator comprising a casing containing a chamber, a flue extending vertically through the casing at one side of the chamber, a heater in communication with the lower end of the flue, means at the upper end of the flue for venting the same, an upwardly swinging lid for the chamber, and circulating pipes having portions leading laterally from the flue below the upper end thereof into the chamber and other portions suspended from the lid and telescopically engaging the first-mentioned portions, said suspended portions branching toward the sides of the chamber and having terminal portions extending through the lid and discharging above the lid.

2. An incubator comprising a casing having a chamber therein, an upwardly swinging lid for the chamber, a heating flue at one side of the chamber, a heater in communication with the lower end of the flue, means at the upper end of the flue for venting the same, an air flue disposed concentrically about the heating flue and open at its lower end and closed at its upper end, a pipe section leading laterally from the heating flue into the chamber, a second circulating pipe section telescopically engaged with the first pipe section and carried by the lid of the chamber and discharging above the same, a pipe section leading laterally from the air flue and disposed concentrically about the pipe section leading from the heat flue, and a pipe section telescopingly engaging the last-mentioned section and carried by the lid and disposed concentrically about the first-mentioned section carried by the lid.

3. An incubator comprising a casing containing a chamber, a heat flue extending vertically through the casing at one side of the chamber, circulating pipes leading laterally from the upper portion of the heat flue into the chamber, an air flue extending vertically through the casing and disposed concentrically about the heat flue and having a closed upper end and an open lower end, the lower open end of the air flue being below the casing, an open-ended tube extending laterally from the air flue and encircling the circulating pipe leading laterally from the heat flue, and a well depending from the bottom of the chamber and disposed concentrically about the air flue and in spaced relation to the sides and the lower end thereof and having an open-ended ring rising from its bottom into the lower end of the air flue concentrically between the two flues.

4. An incubator comprising a casing having a chamber therein, an upwardly swinging lid for the chamber, a heat flue rising through the chamber at one side thereof, a heater in communication with the lower end of the flue, a damper normally closing the upper end of the flue, a thermostat within the chamber, a lever connected with the damper and the thermostat, a resilient arm secured in the upper portion of the chamber and having its free end disposed under the lid to be depressed thereby when the lid is closed, and a stem rising from said arm through the top of the chamber and having an eye encircling the thermostat lever whereby when the lid is raised the damper will be opened.

5. An incubator comprising a casing, a partition extending across the casing and dividing the interior thereof into two chambers, a flue rising through the casing at the center of said partition, a division member extending diametrically across said flue and through the full height thereof, a heater in communication with the lower end of said flue at both sides of said division member, an air flue encircling the first-mentioned flue and said division member, circulating pipes extending from the first-mentioned flue into the respective chambers, and open-ended tubes extending from the air flue an encircling said circulating pipes.

6. An incubator comprising a casing, a partition dividing the interior of the casing into two chambers, means for supporting trays in the respective chambers, concentric vertical heating and ventilating flues disposed centrally of the partition and in communication with the respective chambers, a drinking trough on said ventilating flue within one chamber above the tray in said chamber, a moisture-supplying trough around said flue in the bottom of the other chamber below the tray thereon, and means mounted on the casing and the ventilating flue for supplying water to said troughs.

In testimony whereof I affix my signature.

HARRY W. ZELLNER. [L. S.]